US009339849B2

(12) United States Patent
Pillkahn

(10) Patent No.: US 9,339,849 B2
(45) Date of Patent: May 17, 2016

(54) METHOD FOR DETACHING COATINGS FROM SCRAP

(75) Inventor: Hans-Bernd Pillkahn, Werdohl (DE)

(73) Assignee: ProASSORT GmbH, Werdohl (DE)

( * ) Notice: Subject to any disclaimer, the term of this patent is extended or adjusted under 35 U.S.C. 154(b) by 6 days.

(21) Appl. No.: 14/238,011

(22) PCT Filed: Aug. 10, 2012

(86) PCT No.: PCT/EP2012/003427
§ 371 (c)(1),
(2), (4) Date: Apr. 15, 2014

(87) PCT Pub. No.: WO2013/020712
PCT Pub. Date: Feb. 14, 2013

(65) Prior Publication Data
US 2014/0231314 A1 Aug. 21, 2014

(30) Foreign Application Priority Data
Aug. 10, 2011 (DE) .......................... 10 2011 109 940

(51) Int. Cl.
B07C 5/02 (2006.01)
B07C 5/342 (2006.01)

(52) U.S. Cl.
CPC ...................................... *B07C 5/342* (2013.01)

(58) Field of Classification Search
CPC ...... B07C 5/342; B07C 5/3416; B07C 5/3425
USPC ............................... 209/3, 576, 587
See application file for complete search history.

(56) References Cited

U.S. PATENT DOCUMENTS

| 2,842,435 | A | * | 7/1958 | Milo | ....................... | C22B 25/06 |
|  |  |  |  |  |  | 216/108 |
| 5,042,947 | A | * | 8/1991 | Potzschke | ............ | G01N 21/718 |
|  |  |  |  |  |  | 209/579 |
| 6,540,931 | B1 | * | 4/2003 | Faw | ......................... | C23G 1/10 |
|  |  |  |  |  |  | 134/5 |
| 8,038,894 | B2 | * | 10/2011 | Brooks | ................... | B24C 1/086 |
|  |  |  |  |  |  | 216/100 |
| 2001/0045378 | A1 | * | 11/2001 | Charles | ................. | B07C 5/3412 |
|  |  |  |  |  |  | 209/3.3 |
| 2003/0034281 | A1 | * | 2/2003 | Kumar | .................. | B07C 5/3425 |
|  |  |  |  |  |  | 209/579 |
| 2011/0089086 | A1 | * | 4/2011 | Riise | ....................... | B29B 17/02 |
|  |  |  |  |  |  | 209/10 |

FOREIGN PATENT DOCUMENTS

| CN | 1495279 A | 9/2003 |
| DE | 3718672 A1 | 12/1988 |
| DE | 102008056812 A1 | 11/2008 |
| DE | 102008056812 B4 | 11/2008 |
| EP | 0996774 B1 | 5/2000 |
| EP | 1786564 B1 | 8/2005 |
| WO | 95/17974 A1 | 7/1995 |
| WO | 2010/034465 A1 | 4/2010 |
| WO | 2011/038746 A1 | 4/2011 |

OTHER PUBLICATIONS

PCT Search Report issued Dec. 4, 2012 in connection with related PCT Application No. PCT/EP2012/003427.

* cited by examiner

*Primary Examiner* — Terrell Matthews
(74) *Attorney, Agent, or Firm* — Berliner Steffin Azod LLP

(57) ABSTRACT

The invention relates to a method for the processing of metal scrap, in particular steel scrap, wherein the metal scrap material is treated with at least one fluid with a view to removing surface coatings before a spectroscopic analysis of the metal scrap composition is performed. On the basis of this composition the metal scrap can then be sorted and further processed in a purposeful manner. Moreover, the fluid used for the removal of the surface coatings can be suitably treated to recover the metal constituents contained therein. On the one hand, a resource-conserving and economic recovery of metals, in particular zinc, contained in surface coatings is achieved by means of the inventive method and, what is more, the method also enables a purposeful sorting of metal scrap material to be performed for a variety of uses in the iron and steel producing industry.

15 Claims, No Drawings

METHOD FOR DETACHING COATINGS FROM SCRAP

The invention relates to a method for the reprocessing of metal scrap for which purpose a spectroscopic analysis of the metal scrap composition is carried out.

A major portion of the steel used nowadays, in particular flat bar steel of thin sheet metal or hot-rolled strip, is provided during production or processing into pre-products with a coating which is intended to protect the steel against corrosion. Especially in the field of automotive engineering steel products are frequently employed which have been zinc plated electrolytically or by a hot dipping process. Aside from this, in the case of thin sheet metal also organic coatings are used on a zinc layer usually applied previously, said organic coatings being provided in the form of wet paint and powder coat paint systems or applied as film, for example for so-called whiteware, i.e. household appliances. In the event of tinplate an electrolytically applied tin coating is employed. Tinplate material is used in particular for the production of cans for food, beverages as well in the field of aerosol spray cans, with said tinplate material often being provided with a paint or film coating.

Both in view of the ecological and economic aspects involved it is desirable to recover the raw materials still forming part of the steel scrap in the form of alloying metals. However, problems are encountered here in that the increasing and meanwhile frequently high content of alloying metals in the steel scrap makes it difficult to recycle the scrap material in a systematic manner. In the foundry industry a steel scrap material is needed, for example to manufacture high-strength and tenacious castings for use in the automotive and wind power industrial sectors, that is low in so-called perlite forming constituents such as manganese, molybdenum, and vanadium. A zinc coat applied to the steel scrap is also undesirable which makes the situation even more difficult. In the manufacture of deep drawing steels for the automotive industry, however, especially these perlite forming constituents serve to enhance the strength of the steel. A coat of zinc is then applied to protect the surface against corrosion. These are all reasons that to an increasing extent prevent the enormous amount of scrap produced through the processing of thin sheet metal to be employed as that is to say indispensable raw material for the foundry industry. Other accompanying constituents of steel scrap such as copper or tin are, on the one hand, detrimental to steel because they cannot be eliminated metallurgically and have a negative effect on the relevant mechanical and technological properties but on the other hand are to be considered excellent perlite forming components for the production of lamellar-graphite grey cast iron.

Currently, alloying components of the steel scrap inconsistent with the targeted analysis are transferred, to the extent possible from a metallurgical viewpoint, into the slag during the steel manufacturing process. As a result, considerable amounts of in fact valuable raw substances are virtually destroyed or converted into a form that rules out they can be reused in an economical way.

An expedient approach would be a process by means of which the steel scrap to be recycled could be sorted according to alloying components before the scrap is used as secondary raw material in the ironmaking industry such that its composition to a large extent coincides with the composition of the newly produced cast iron or steel obtained completely from the use of the steel scrap or with the substantial addition of the steel scrap material. However, according to the state of the art this can normally be achieved only if the entire steel scrap volume to be processed stems to a major extent from a defined scrap producing location where the scrap is kept separate already when it arises. In actual practice, however, a strict separation of scrap material at the time the scrap arises is to be regarded as the exception to the rule.

In the scrap recycling sector endeavors are made by scrapyards to sort scrap material according to its alloying content. In this context, scrap assumed to be correctly sorted is kept separate and randomly analyzed with the aid of mobile optically operating analyzers to detect the relevant alloying contents. New scrap material of uncertain origin is also analyzed on a random basis. Such an analysis can only be carried out, however, if the surface of the scrap pieces is free from metallic or organic coatings. Therefore, such coatings are initially removed on a piece by piece basis by means of a manual grinding device before an analysis of the alloying composition of the then white metal surface can be made. Taking specimens is time consuming, expensive and statistically inadequate in view of the few number of specimens assessed in relation to the total scrap volume.

Even more problematic is the recycling of old scrap material. This material is usually shredded to increase the scrap bulk density so that transportation expenses can be saved or the scrap is sheared to enable short scrap lengths to be put to use. An analysis of the alloying constituents in the steel of shredded or sheared scrap material is not only statistically inadequate but in fact also impossible to implement at the present time so that this scrap material is often used for less important purposes, in particular shredded scrap frequently lends itself merely to being used as reinforcement steel. In Germany, however, reinforcing steels constitute only a minor portion of the steel products manufactured nowadays. The major amount of shredded scrap material is thus exported and in this way eliminated from the raw materials cycle.

From publication DE 37 18 672 A1 a method is known wherein metal parts are analyzed and a sorting signal is produced with a view to activating a sorting system. The analysis is performed with the help of a pulsed laser beam. In case of items provided with a coating surface material can be vaporized by laser pulsing before the actual analysis is carried out. As regards sorting, a distinction is made merely between different metals, that is, aluminum components are separated from copper components, for example. The method may be of use when very thin coatings are concerned and the throughput of the sorting equipment is low; however, in the event of hot dip galvanized scrap material having a zinc coating of >10 μm and if the sorting capacity allows for the processing of many tons per hour this method does not appear feasible neither from a technical nor economic viewpoint.

It is therefore the objective of the present invention to provide a method wherein scrap material can be effectively and economically sorted according to its alloying contents to enable the scrap sorted by composition to be subsequently made available for the most economic and as far as raw material is concerned most efficient uses.

This objective is to be achieved in accordance with the invention by a method for the reprocessing of metal scrap material embracing the following steps:

Treatment of metal scrap with at least one fluid/liquid to remove surface coatings, spectroscopic analysis of the scrap metal composition, sorting of the metal scrap materials according to the composition of the scrap metal, and treatment of the fluid/liquid with a view to recovering the metal contained in the surface coatings.

In accordance with the invention a method is provided by means of which an automated and precise analysis as well as sorting of metal scrap pieces, in particular of steel scrap pieces, can be performed with sorting taking place according to composition. For this purpose, minor amounts of alloying constituents can also be taken into account, which may preferably be below 800 ppm. Furthermore preferred are also amounts below 500 ppm, in particular below 100 ppm, and especially preferred below 10 ppm for detection by the analysis and be taken into account for sorting purposes. This can be achieved, inter alia, by way of several measurements to be taken on each piece of scrap and evaluated statistically wherein suitable measuring positions being determined beforehand. This enables an especially precise analysis of the composition to be achieved. Other than is possible within the current state of the art, scrap components consisting of a certain metal can thus not only be roughly sorted to separate them from scrap pieces comprising of different metals in this way but, what is more, the method provided also takes especially into account that scrap as a rule contains a variety of different alloying constituents the contents of which must not go beyond certain limits or must be within a prescribed range to meet respective recycling requirements. Significantly more often than in the past, the scrap volumes arising can be made available in this manner to more sophisticated recycling options of higher quality whereas scrap recycled hitherto, in particular old scrap material, could merely be employed for less significant application purposes due to the composition of the scrap.

As provided by the present invention several processes are combined with each other in an advantageous manner. A treatment of scrap metal by means of a fluid with a view to removing surface coats from the scrap metal is thus expedient in order to cause the metallic coatings to come off as a result of this and enable in this way the relevant metal to be recovered subsequently. Primarily, this relates to zinc employed in significant amounts in the production of zinc coated scrap materials. Surprisingly, it has now been found that such a removal of the surface coating causes the metal substrate to be exposed to such an extent that an analysis could subsequently be performed by means of spectroscopy to determine the composition of the scrap material without an additional surface treatment being required, for example by mechanical methods using grinding devices or the like. The extremely tedious and laborious singling out of individual scrap pieces and processing them by means of manual grinding devices to make the bright surfaces suitable for analysis can thus be dispensed with. If thought appropriate, the metal scrap treated with the fluid may be subjected to a drying step before analysis is carried out to eliminate still adhering fluid remnants. Even an analysis of shredded old scrap material can be performed by means of the inventive method, an exposure of the surface of which has hardly been feasible hitherto due to the fact that surface grinding of numerous small scrap fragments is impossible. Moreover, the inventive method also offers substantial economic benefits because the exposure of a bright surface which is suitable for analysis by treating the metal scrap with a fluid instead of processing it by means of a grinding device opens up additional opportunities in that the metal constituents still present in the surface coats can be recovered and thus put to use again. Although the step of treating the fluid with a view to recovering the metal constituents the surface coatings still contain results in the inventive method to be of special interest economically, such a step is not absolutely necessary as far as the inventive sorting of the scrap is concerned so that a respective method which does not embrace this step is also to be understood as forming part of the present invention.

Treating the scrap pieces with one or several fluids (pickling) can be effected, with respect to location and time, separately from the subsequent steps of sorting the scrap on a piece-related basis. Surprisingly that is to say, it has been found that after the pickling treatment a residual film of oil remains on the scrap surface resulting in the formation of rust being greatly delayed and that this developing rust layer does in no way impair the subsequent analyzing step.

In particular, the surface coatings involved in this context consist of zinc and tin metals that are very commonly used for this purpose. Especially the removal of a zinc layer may be achieved with the help of an acidic or alkaline solution, wherein the use of an acidic solution is to be given preference due to the fact that coat removal can be effected significantly more rapidly at lower temperatures. As has been described in international patent applications WO 2011/038746 A1 and WO 2010/034465 A1 the undesirable dissolution of iron otherwise occurring as well when using an acidic dezincing process can also be prevented to a large extent by adding an oil or by preloading the acidic solution with zinc ions. This was based on findings that the presence of zinc ions in the acidic solution led to a considerably accelerated zinc dissolution resulting in the time of contact with the scrap material to be dezinced to be minimized to such an extent that the iron dissolution had only just begun. By combining the removal/pickling process with the analyzing step a continuous signal may be produced and transmitted to the pickling process furnishing information about the residual zinc layer still adhering to the scrap surface so that said pickling process can be appropriately adjusted in particular with respect to the time of contact between scrap material and fluid. Via said signal, for instance the conveying speed of an oscillating conveyor serving as pickling system can be controlled which in this manner has an influence on the pickling time and in turn on the dissolution of iron.

Apart from this, other possible ways of removing iron from a solution are known from prior art, for example a precipitation in the form of hydroxide, in the form of jarosite, goethite or hematite. Relevant methods can be seen, inter alia, from Ullmanns Enzyklopädie Technische Chemie, 4th edition, volume 24, pages 602 et seq. As acid, in particular sulfuric acid is used the concentration of which typically amounts to 100-600 g/l, in particular 150-500 g/l, for example approx. 250 g/l. Said acid is used at a temperature typically ranging between 15 and 70° C., preferably between 40 and 60° C., wherein as a rule a few minutes' time of contact between the acidic solution and the steel scrap is sufficient. During tests, even a contact time of only 60 s has been found sufficient.

Dezincing may also take place in an alkaline environment, however, as has been described in European patent application EP 0 996 774 B1. For this purpose, a sodium or potassium hydroxide solution is typically used, wherein the amount of sodium or potassium hydroxide advantageously amounts to at least 15% by weight to make sure the zinc layer can be eliminated sufficiently fast. The reaction temperature should be >75° C. to enable the reaction to take place within a period not exceeding 2 h. To increase the speed of zinc dissolution even more the removal of the zinc layer may be achieved by means of a galvanic corrosion process, i.e. the zinc component serves as anode where the oxidation from zinc into zinc ions takes place while a second metal which is stable within the alkaline solution serves as cathode on which hydrogen can develop/form.

Preferably, the zinc coated scrap pieces are to be presorted, with such a sorting step being particularly expedient with a view to subclassifying the scrap as to the type of surface coating and/or outer appearance. Such a subclassification in the sense of the invention means the scrap pieces are appropriately presorted which does not in any case make it necessary to arrange for a preliminary sorting step. Provided the items are of comparable origin, i.e. are domestic appliances or new automobile scrap, a separate preliminary sorting step can be omitted. Otherwise, a rough pre-sorting step is considered useful. In this manner it is ensured that when the scrap pieces are treated with a certain fluid or with various fluids applied in succession the surface coats are removed from all the scrap material to such an extent that the relevant composition can be determined when carrying out the analyzing step. For example, a decision can be easily made by those skilled in the art as to whether an acidic or an alkaline solution is sufficient for treatment of a given type of scrap material or whether a preliminary treatment using an organic pickling agent such as methylene chloride should be carried out for a given type of scrap.

After the surface coatings have been removed another step is advantageously implemented by means of which the scrap pieces are segregated. This enables the composition of each individual piece of scrap to be determined within the analyzing step without other pieces or fragments impairing or interfering with the analysis of individual parts.

A preferred embodiment provides that the positions of the scrap pieces are determined—appropriately after the step of segregating the scrap pieces has been completed—as well as spatial information obtained, especially about the form/shape relative to the scrap pieces. If this has been done, an automated determination of the locations on the scrap pieces takes place where a spectroscopic analysis of the composition can be made based on the positions ascertained and spatial information acquired. The term position particularly refers to the position of the scrap piece lying on the conveying equipment. When the scrap pieces are moved via the conveying equipment the position of such a scrap piece in space naturally changes but it does not change relative to the conveying equipment.

Determining the position of the scrap pieces may be achieved by means of a 3D scanning step which may also serve to obtain information of spatial data about the scrap pieces. In this way, the form/shape of the scrap pieces can be captured. Spatial information obtained about the scrap pieces, especially regarding their shape, is then automatically assessed with a view to finding the locations where a spectroscopic analysis can be performed without difficulty. The analysis can be significantly accelerated in this manner since the number of unsuccessful analysis steps is minimized. 3D scanning technology in most cases realized with the help of a laser is sufficiently known from prior art to relevantly skilled persons and is used for a variety of applications, for example to determine the shape of dental arches for rapid prototyping purposes etc. To merely cite an example in this context reference is made to a documentary overview published by W. R. Scott, G. Roth, ACM Computing Surveys, Vol. 35, 2003, p. 64-96, entitled "View Planning for Automated Three-Dimensional Object Reconstruction and Inspection".

In lieu of capturing the position and shape by means of 3D scanning other techniques are conceivable as well. The position of the scrap piece may, for example, be determined by electromagnetic induction. For this purpose coils may be provided, for example arranged underneath the conveying belts, said coils in conjunction with a capacitor forming an oscillating circuit so that the scrap piece position can be captured electronically. Devices operating on electromagnetic induction by means of which the presence of a metallic object can be detected are basically known to those skilled in the art.

Using a (pulsed) laser spatial information about the scrap pieces can also be obtained by establishing parallelly to the conveying direction a contour line of each scrap piece via the light propagation time. As regards scrap pieces where a great difference in elevation exists either inherently or on a piece to piece basis this configuration serves as preparation for the subsequent analysis step in a manner that enables the sufficiently precise focusing of a light-optical process employed for the actual measurement. The spatial information captured is employed to make decisions as to the locations where as subsequent step an analysis of the steel scrap composition is to take place. Determining the contour line results in the cycle time of the measurements to be accelerated and the measuring accuracy enhanced. Moreover, in this way the influence of relative movements of the scrap pieces relative to the conveying belt is eliminated to a large extent meteorologically.

In the event that individual components of the scrap material turn out to be unsuited for a spectroscopic analysis, for example because such items are foreign objects made of other metallic materials or plastic or are scrap items the surface coatings of which could not be removed by treating them with at least one fluid, these components may be automatically sorted out after the spectroscopic analysis has been completed and may be omitted from the sorting process proper. As a result of this, an impairment of the quality of the sorting fractions is ruled out.

Treatment of the scrap surface with the fluid may be effected either in the form of passing the metal scrap material through a suitable immersion bath (immersion pickling) or in the form of spraying the fluid onto the metal scrap surface (spray pickling). Spray pickling, for example carried out on an oscillating conveyor, offers the advantage that the process can be carried out on a continuous basis without the entire contents of an immersion tank having to be replaced from time to time. In the event a spray pickling process is employed the fluid used should be intercepted to enable it to be recycled.

Further transportation of the scrap can then be effected with the help of the oscillating conveyor which is also used for the spray pickling process itself. Such conveyors are mechanical handling systems usually employed for bulk materials of varying nature by means of which the medium to be transported is moved through oscillation. A typical oscillating conveyor designed in the form of a vibratory trough is equipped with a conveying trough performing for transportation an inclined upward movement in the conveying direction and back, i.e. this movement not only has a vertical component but also a horizontal element in conveying direction. In this way, the material to be transported is thrown upward and, after the conveying trough has performed its return movement, falls down in an area located nearer to the outlet end of the conveying trough in conveying direction. The material to be transported enters the conveying trough at the inlet end and in the described fashion moves "jerkily" little by little towards the outlet end as a result of the oscillations throwing it a bit up and in the direction of the outlet end. Another form of oscillating conveyor is the vibrating chute which other than the oscillating trough of the type described hereinbefore only performs a "to and fro" movement, i.e. moves in horizontal direction only but has no vertical element. Accordingly, the transported material is not "thrown up" and with each oscillation performed rather slides a little bit forward in conveying direction. Each oscillatory motion initially causes the chute to be moved in conveying direction and when this movement has stopped abruptly accelerates the chute in opposite direction. Due to the inertia of the scrap the individual components each time slide a bit forward in the direction of travel.

Spray pickling with the help of an oscillating conveyor offers the benefit that the position of the scrap pieces constantly changes so that all sides are wetted with fluid. To even intensify this effect, the bottom of the conveying trough can be equipped with one or several steps or other obstacles which are suited to bring about a turning or rotation of the scrap pieces. Treating scrap material by means of an oscillating conveyor offers additional advantages in that the individual scrap components or fragments constantly contact each other due to the vibratory movement with relevant surfaces suffering injuries caused by sharp-edged scrap pieces. Such damage to the coating simplifies its removal because the coating more often than not is a passivation layer. If so desired, openings may be provided in the conveying trough through which the fluid can exit. Expediently, the fluid is collected below the conveying trough.

The spectroscopic analysis of the composition of the scrap pieces takes preferably place while said pieces are moving, i.e. the entire method is implemented in the form of a continuous process. Preferably, further processing steps are also performed during movement, such as the determination of the position and obtaining spatial information about the scrap pieces, sorting out of relevant scrap components and sorting of the scrap pieces. To make sure a high throughput can be achieved, it is of advantage to move the scrap pieces at a speed of at least 2 m/s. For this purpose, particularly transportation or belt conveyors can be employed.

Moving the scrap pieces can be brought about in particular with the help of transportation or belt conveyors as well as with the help of oscillating conveyors, especially vibratory troughs or vibrating chutes. To increase the efficiency even further, the scrap to be processed may, with a view to enlarging the scrap areas in contact with the fluid, expediently be pre-treated mechanically, in particular size-reduced, shredded, roughened and/or deformed in some other manner before it is brought into contact with the fluid. However, the scrap pieces reduced in size must still be large enough to enable a spectroscopic analysis to be carried out.

Especially, if there are additional organic coatings the metal scrap may consecutively be brought into contact with several different fluids to remove the different types of coating. For example, a treatment with a stripping compound may initially be carried out to remove an organic coating, followed by applying sulfuric acid intended to achieve the dezincing of the metal scrap material. As stripping agent organic solvents are particularly usable, such as aliphatic or aromatic hydrocarbons, chlorinated hydrocarbons, alcohols, glycol ether, dicarboxylic acid ester, and acetone or similar means. Very frequently applied is methylene chloride. Depending on the reaction regime provided it is also possible to remove the organic coat as a result of the acidic or alkaline treatment being performed, and it has turned out in this context that the dissolution of the metallic surface coating led to other coatings such as paint or varnish applied on top of it to be removed as well. The reason for this is presumably that the acid or solution is capable of migrating under the surface of the other coatings so that when the metallic coat has been dissolved and thus detached from the scrap steel substrate they no longer have a basis they can cling to and as a result become detached is as well. It has been found that in most cases a treatment with acidic or alkaline solution has already proved sufficient.

The spectroscopic analysis to determine the scrap metal composition can then be performed on the bright surface so produced making use of processes that are generally known from prior art, in particular with the help of techniques such as laser spectroscopy, X-ray fluorescence spectroscopy or photoelectron spectroscopy. Especially preferred is the laser induced breakdown spectroscopy (LIBS) process by means of which a highly energetic very short laser pulse is focused onto the surface to be examined. Said laser pulse causes the material to be excited to high temperatures producing light emitting plasma with the resulting emission being characteristic of the material under examination. Another process is laser ablation by means of which small amounts of sample are removed by the focused laser beam, with the sample obtained being transferred via a gas stream into a detector where characterization takes place.

In the event of X-ray fluorescence spectroscopy the material sample is excited through highly energetic X-radiation, whereupon the near-nucleus electrons of the atoms present in the material sample are caused to be ejected. Electrons of a higher energy level are then taking up the sites of the ejected electrons and the energy liberated in this way is emitted in the form of element-specific fluorescence radiation capable of being assessed by means of a radiation detector.

In the event of the photoelectron spectroscopy an electron in the solid body to be analyzed is at first excited by an ingressing photon and then transported to the surface before it is finally exiting in the form of a photoelectron. The exit direction and the kinetic energy of the photoelectrons enable conclusions to be drawn with respect to the composition of the solid body. In particular, the technique employed may be X-ray photoelectron spectroscopy (XPS).

It is considered useful for the method to be automated to the extent possible. This allows the metal scrap pieces to move past the sensor of the spectrometer, however it may also be arranged for the sensor to pass along/over the metal scrap pieces. Preferably and other than is common use according to the state of the art, no random samples are taken just for the purpose of estimating a large population, but rather an analysis is carried out based on several, preferably a plurality of measurements taken on each piece of scrap which are then employed for statistical evaluation so that runaway values of the total measuring results pertinent to a scrap piece are eliminated with a view to obtaining concrete information about the composition and the alloying constituents of the individual scrap items. The distance between the individual points of measurement preferable amounts to just a few millimeters. Even very small amounts of alloying additions such as low-alloy fine-grain forming constituents can be determined in this way and taken into account in the sorting process. Aside from the spectroscopic analysis of the composition of the scrap pieces the method may also embrace a determination or estimation of the mass of the individual pieces of scrap.

Moreover, the subsequent one- or multi-step sorting process should advantageously be performed automatically, with certain sorting criteria being adopted to suit the intended utilization of the metal scrap. In particular, upper limits can be defined applicable to different metals contained in the metal scrap, for example with respect to zinc, tin, manganese, copper, chrome, nickel, molybdenum, vanadium, and/or niobium. For many uses it is of decisive significance that the recycled steel material does not at all or only to a very minor amount contain certain elements or components. It is of course also conceivable to make arrangements for sorting the metal scrap in such a manner that the contents of certain metals are each kept within certain limits and obtain by this approach metal scrap that has been sorted with a view to obtaining an alloying composition that coincides with the desired alloying composition to the extent feasible. It is possible as well to sort out any scrap items that contain fine grain forming constituents. Moreover, the sorting process makes it possible to add scrap items of a certain composition to a sorting fraction the composition of which is similar, wherein said sorting fraction then being put to such a use that requires the respective alloying composition. In this manner, sorted scrap material is obtained the alloying composition of which coincides to the extent possible with the alloying composition aimed at, for example a composition having an increased copper content. A purposeful sorting method also makes it possible to effectively compensate the known melting loss behavior of alloying constituents by allowing for an appropriately higher portion of the respective alloying elements to be included already in the scrap material composition. The sorting process may be implemented with the help of commonly known mechanical or pneumatic techniques, for example in that the metal scrap continuously transported via a belt conveyor is appropriately routed to and collecting in different containers provided for this purpose.

Advantageously, the fluids needed to remove the surface coatings are recycled at least in part so that the metal constituents the surface coatings contain can be recovered. Primarily, this relates to zinc employed in significant amounts in the production of zinc coated scrap materials. This approach makes the method especially cost-efficient because the fluid treatment thus provided not only enables a spectroscopic analysis to be performed but also results in the recovery of valuable metals. In this case, the metallic salt precipitate separated from the fluid (the pickling electrolyte) should only contain traces of organic impurities. Suitable measures should be taken in the removal process (pickling process) that this can be achieved. It has, surprisingly, been found that under the given ambient conditions an anticorrosion oil originating from the scrap material received from scrapyards or a forming oil present in an amount of one gram of oil per square meter of scrap surface can be quickly and completely segregated and withdrawn at an appropriate location after the pickling process proper. If it is expected the oil input into the process is too high, which may be the case if new scrap material from press/stamping operations is used directly without having been stored intermediately, the scrap surface may be subjected to a preceding degreasing process. Aside from zinc also tin or chrome are frequently used and valuable metals that can be recovered and put to use again in this context.

The processing steps of treating the scrap pieces with at least one fluid, segregating the scrap pieces, determining the position and obtaining spatial information with respect to the scrap material and/or the spectroscopic analysis of the composition of the scrap pieces may also be repeated once or several times if this proves to be necessary. For example, if the spectroscopic analysis shows that in view of the condition the scrap material surface is in a sorting of the scrap pieces cannot yet be reasonably performed, the steps of the processing cycle mentioned hereinbefore may again be gone through. For this purpose, the scrap pieces are again to be treated with a fluid to remove still adhering surface coatings. In this way, the surface coatings are removed one after the other. The relevant fluids may be selected on the basis and results of the spectroscopic analysis, i.e. if it is detected during said spectroscopic analysis that a certain surface coating is still present on the material a fluid is selected, preferably in an automated fashion, which is capable of removing the relevant coating. Following this, the scrap pieces are to be segregated again purposefully to make sure the analysis can be performed without other scrap items exerting a falsifying influence, with determination of position and spatial information as well as spectroscopic analysis taking place afterwards. The cycle referred to can also be repeated several times until the results of spectroscopic analysis show that no more coating material need be removed. Possibly, it may also be adequate to just carry out the steps of coating removal and spectroscopic analysis repeatedly until a sorting step can be implemented.

If so desired or thought expedient, the other steps of sorting out scrap components and/or the automated sorting of scrap items may also be integrated into the described cycle of processing steps repeatedly carried out. For example, it may be that some of the scrap pieces are already in a condition that permits the sorting step to take place whereas there are others that still require further treatment. In this case, the latter scrap items are returned with a view to subjecting them again to a fluid treatment. It is also feasible to carry out individual processing steps several times while other processing steps are performed only once.

Segregating or singling the scrap pieces may be achieved in a manner that provides for the arrangement of a plurality of modules in succession, said modules each moving the scrap pieces at different speed rates. For example, a first module may move the scrap pieces at a relatively low speed of e.g. 5 m/min. This module then transfers the scrap pieces to another module where they are passed on at the considerably higher speed of e.g. 180 m/min. In this manner, the distance between the scrap pieces is increased, i.e. the pieces are segregated or made single such that a separate analysis is possible. If so desired or necessary, further modules may be arranged between the modules that operate at minimum and maximum speed rates, wherein said further modules moving the scrap components at medium speed. For instance, a typical speed cascade may be 5 m/min.-25 m/min.-100 m/min.-180 m/min.

If necessary, the speed may again be reduced after the step of segregating the scrap items to enable the determination of position and spatial information, for example by means of 3D scanning, as well as the spectroscopic analysis to be performed, but as a rule this is not required. The modules referred to may be both oscillating conveyors and transporting belt conveyors, wherein the modules operating at lower speed rates typically are oscillating conveyors and the higher-speed modules transporting belt conveyors. In particular, the module operating at minimum speed may be an oscillating conveyor (oscillating/vibratory trough or vibrating chute) whereas the maximum speed module may be a belt conveyor. Using oscillating conveyors at the beginning of the step of segregation is also useful as their action results in forcing apart scrap pieces loosely sticking together or connected with each other.

Especially the segregation of the pieces may thus be brought about by suitably combining oscillating troughs with belt conveyors for scrap movement. Due to the momentum each piece of scrap gains in the oscillating troughs due to the vertical acceleration component of a magnitude of several times the force of gravity the scrap items can first be spread uniformly over the oscillating trough area. Following this, the scrap pieces may be forced to follow predetermined paths by providing defined flow obstacles. In conveying direction the scrap items are accelerated, in particular with a material transfer taking place from oscillating troughs to belt conveyors. By purposefully influencing the speed in several, preferably at least three speed-controlled sections or modules operating independently of each other the segregation of the pieces has been achieved in the following section where measurements are taken. The distance between the pieces in lanes/on paths depends on the geometry of the pieces and the time required for analysis assessment which in particular applies when minute alloying constituents are to be detected.

Controlling the conveying speed rates of the individual modules is preferably achieved via a process control value taking into account the requirements to be met for segregation purposes. This value is expediently obtained on the basis of determining the shape and position of the scrap pieces which anyway takes place by 3D scanning or other techniques.

The invention in particular relates to the processing of steel scrap material in connection with which problems are encountered as elucidated hereinbefore and which arises in large quantities. Basically, the inventive method may be employed, however, for other metal scrap material as well where recycling is more difficult as a result of surface coatings. Especially, aluminum, zinc and copper scrap is to be named in this context. It is to be understood that the treatment of scrap to remove surface coatings varies to suit the respective type of scrap material.

In accordance with an especially preferred embodiment the invention relates to a method for reprocessing zinc-coated and pre-sorted steel scrap pieces comprising the following steps:

- Treatment of the steel scrap pieces depending on sorting using at least one fluid with a view to removing surface coatings, wherein one fluid is an acidic or alkaline solution,
- Segregation of the steel scrap pieces,
- Determination of the positions of the steel scrap pieces as well as obtaining spatial information about the steel scrap pieces, and automated detection of the locations on said pieces where a spectroscopic analysis of the composition is possible based on the positions and spatial information so determined and obtained.
- Spectroscopic analysis of the composition of the steel scrap pieces to detect a plurality of alloying constituents, wherein several measurements are carried out on each steel scrap piece and automatically evaluated statistically,
- Automated sorting out of components of the steel scrap material the surface of which after a treatment with at least one fluid does not allow a spectroscopic analysis to be carried out, and
- Automated sorting of the steel scrap pieces according to composition, wherein said sorting is carried out depending on the requirement that the contents of certain alloying constituents do not exceed prescribed upper limits in each case or are situated within a predetermined range.

The invention claimed is:

1. Method for the processing of metal scrap having a surface coating, comprising the following steps:
   - treating metal scrap with at least one fluid to remove surface coatings,
   - determining the position of the scrap pieces and the shape or form of the scrap pieces,
   - making an automated determination of the locations on the scrap pieces based on the positions so ascertained and the shape or form of the scrap pieces whereby a spectroscopic analysis of the composition can be performed,
   - spectroscopically analyzing the scrap metal composition,
   - sorting the metal scrap materials according to the composition of the scrap metal, and
   - treating the fluid whereby to recover the metal contained in the surface coatings.

2. Method according to claim 1, characterized in that the surface coatings contain zinc or tin.

3. Method according to claim 1, characterized in that the fluid is an acidic or alkaline solution.

4. Method according to claim 1, characterized in that the spectroscopic analysis is performed by means of laser spectroscopy, X-ray fluorescence spectroscopy or photoelectron spectroscopy.

5. Method according to claim 4, characterized in that the spectroscopic analysis is performed by means of laser induced breakdown spectroscopy.

6. Method according to claim 1, characterized in that sorting of the metal scrap is carried out in an automated fashion.

7. Method according to claim 1, characterized in that the sorting of the metal scrap pieces is carried out depending on the requirement that the contents of certain alloying constituents do not exceed prescribed upper limits in each case or are situated within a predetermined range.

8. Method according to claim 7, characterized in that the metals, the sorting of which is governed by the observance of upper limits, are zinc, tin, manganese, copper, chrome, nickel, molybdenum, niobium, and/or vanadium.

9. Method according to claim 1, characterized in that the metal scrap consists of steel scrap.

10. Method according to claim 1, characterized in that the spectroscopic analysis of the composition of the metal scrap takes place while the scrap pieces are moving.

11. Method according to claim 1, characterized in that the scrap pieces are segregated after the treatment with at least one fluid.

12. Method according to claim 1, characterized in that in the framework of the spectroscopic analysis several measurements are taken on each piece of scrap and evaluated statistically in an automated fashion.

13. Method according to claim 1, characterized in that after the spectroscopic analysis such components of the metal scrap are automatically sorted out, the surface of which after the treatment with the at least one fluid does not allow a spectroscopic analysis to be carried out.

14. Method according to claim 1, characterized in that the scrap pieces are pre-sorted with respect to the type of surface coating and/or their outer appearance.

15. Method according to claim 10, characterized in that the scrap pieces are moving at a speed of at least 2 m/s.

* * * * *